Sept. 4, 1956  J. HOLST  2,761,397
TRAILER
Filed Dec. 21, 1951  4 Sheets-Sheet 1

INVENTOR
JOHN HOLST
BY
ATTORNEY

Sept. 4, 1956  J. HOLST  2,761,397
TRAILER
Filed Dec. 21, 1951  4 Sheets-Sheet 2

INVENTOR
JOHN HOLST
BY
ATTORNEY

Sept. 4, 1956　　　　　　　　　J. HOLST　　　　　　　　2,761,397
TRAILER

Filed Dec. 21, 1951　　　　　　　　　　　　　　　　4 Sheets-Sheet 3

INVENTOR
JOHN HOLST
BY
ATTORNEY

Sept. 4, 1956 J. HOLST 2,761,397
TRAILER
Filed Dec. 21, 1951 4 Sheets-Sheet 4

INVENTOR
JOHN HOLST
BY
ATTORNEY

United States Patent Office 2,761,397
Patented Sept. 4, 1956

2,761,397
TRAILER

John Holst, Bronxville, N. Y., assignor to Air Reduction Company, Incorporated, New York, N. Y., a corporation of New York Application December 21, 1951, Serial No. 262,797

7 Claims. (Cl. 105—360)

This invention relates to transport vehicles adapted for use in conveying a substantial number of elongated gas containers from a place of supply to a place of use. More especially, the invention relates to transport vehicles or trailers of a type somewhat similar to those disclosed in the Ragonnet Patents Nos. 2,001,347 and 2,087,300 which are assigned to the same assignee as is the present application. The vehicles or trailers of the present application have incorporated therein a number of novel structural features by reason of which they offer numerous advantages in use not heretofore found in vehicles or trailers of this type.

The broad objects of this invention are much the same as are those disclosed in the Ragonnet patents which are to provide economical, secure, safe and desirable means for making large deliveries of compressed gas or the like to relatively large volume consumers thereof.

A particular object of this invention is a novel built-up frame structure for supporting the plurality of containers in such manner that the containers are more readily accessible for individual removal and replacement, an important feature of this characteristic of the structure being that the containers are maintained slightly spaced from one another whereby no container is called upon to support the weight of another.

A further object of the invention is to provide means for removably securing the containers individually to the supporting framework so that rotational or sliding movement of each is prevented. An additional object is to provide such means, however, which will permit limited movement of one end of each container whereby dimensional changes in such container due to temperature or pressure variations can be readily accommodated.

These and other objects and advantages of the invention may be realized from the following description of a preferred embodiment thereof set forth in connection with the accompanying drawings, wherein, Fig. 1 is a side elevation of a transport vehicle or trailer constructed in accordance with this invention and illustrating the exterior appearance thereof;

Figure 1:
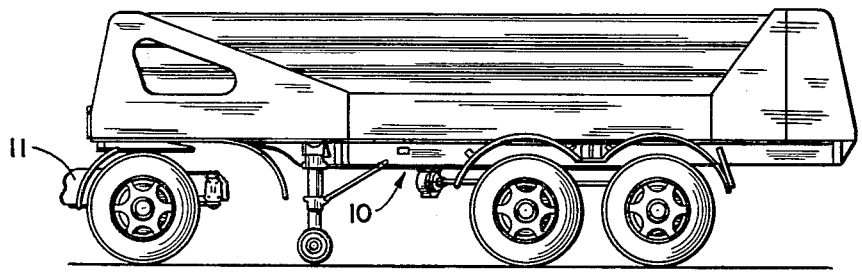

Referring first to Figs. 1 through 3, 10 indicates generally a semi-trailer adapted to be drawn by a detachable tractor unit, a rear portion 11 of which may be seen in Fig. 1. The base framework of the trailer comprises a pair of longitudinally extending sills 13 which support and have secured to them in any suitable manner spaced cross beams. A plurality of substantially vertical partitions 14 (Fig. 2) are supported on the cross beams and extend longitudinally of the trailer, dividing it into three bays. Each partition 14 includes a number of vertical angle irons 15 to which are adapted to be secured, as by bolting thereto, built up frameworks indicated generally at 16 and 18 in Fig. 2. The function of the frameworks 16 and 18 is to support a plurality of elongated containers 17 in horizontal rows within the three bays of the trailer as will be hereinafter more fully pointed out.

Figure 2:
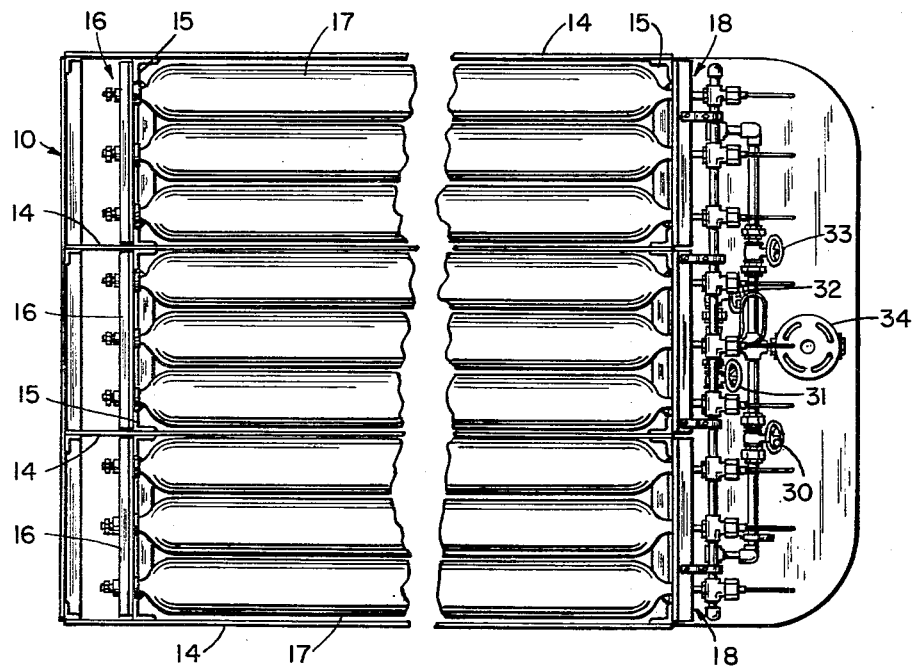
Fig. 2 is a plan view of the trailer of Fig. 1.
Figure 3:
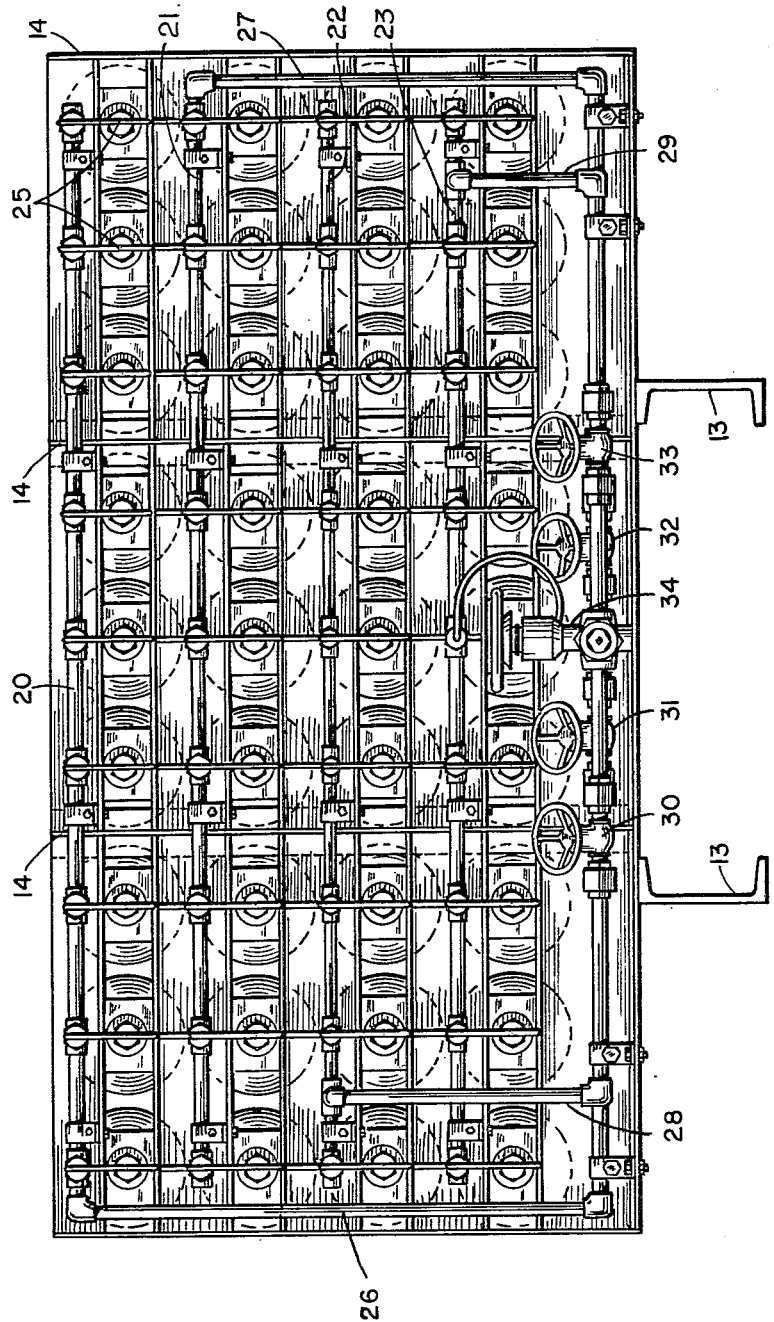
Fig. 3 is an end elevation of the upper rear portion of the trailer.
Figure 6:
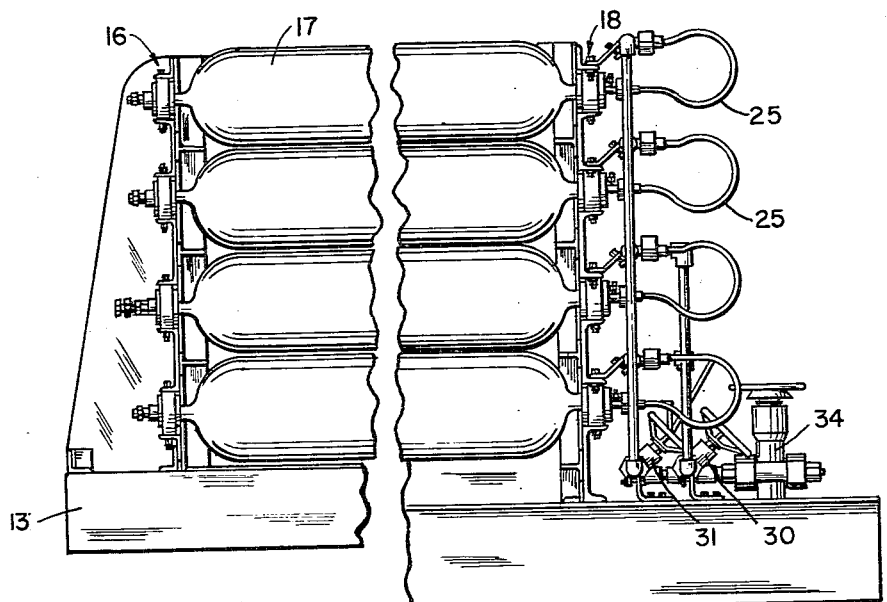
Fig. 6 is a side elevation of a portion of the trailer illustrating the inner framework, the manifolding and the connections of the cylinders to the front and rear frameworks.

At the rear end of the trailer, that is, at the right hand end thereof as seen in Fig. 2, there is provided the manifolding and piping for supplying compressed gases to and for withdrawing them from the various containers 17. While this manifolding does not form a part of the present invention, it is illustrated in Figs. 2, 3 and 6 and will be briefly described. It comprises a plurality of manifolds 20, 21, 22 and 23, each being respectively connected by smaller conduits 25 to each of the various containers in a corresponding horizontal row thereof. The manifolds 20, 21, 22 and 23 are connected by pipes 26, 27, 28 and 29 to header pipes controlled individually by valves 30, 31, 32 and 33. Each of the header pipes is in turn connected to a master valve 34 through which the gas flows to or from the containers 17.

Figure 4:
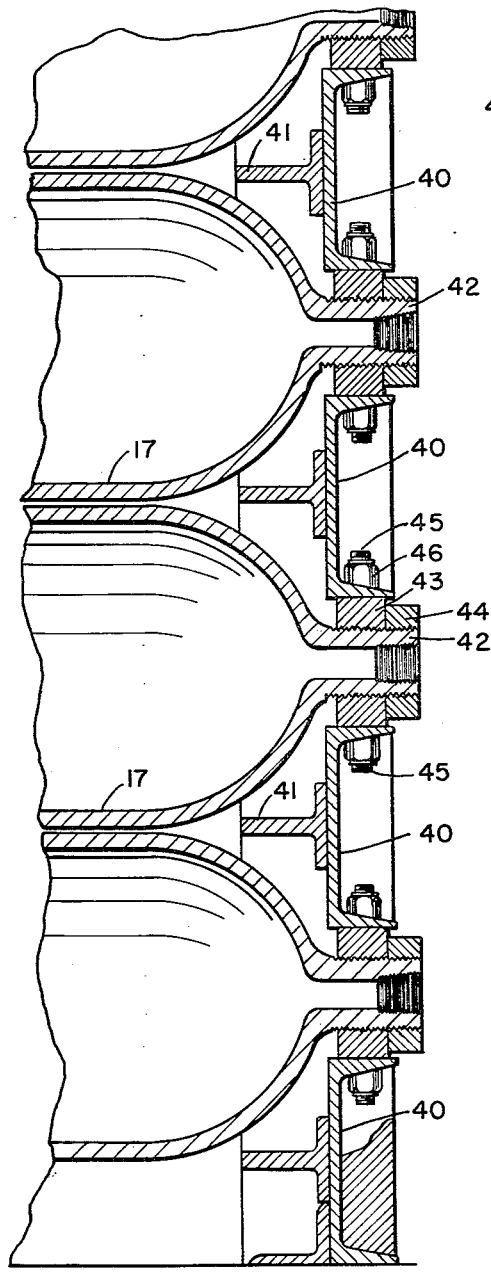
Fig. 4 is a side elevation in section of a portion of the rear end of the trailer.
Figure 5:
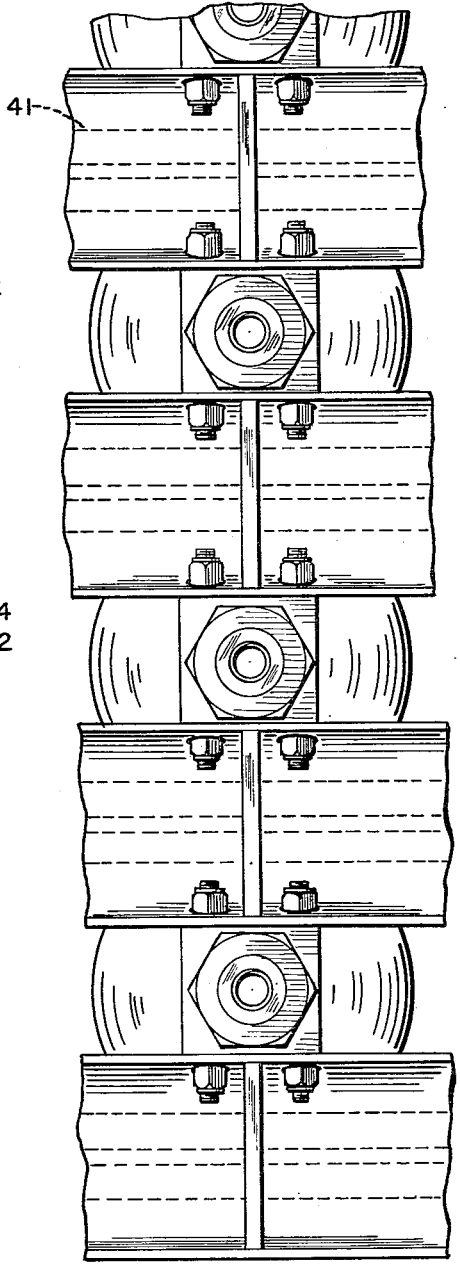
Fig. 5 is an end elevation of the same portion of the trailer as is shown in Fig. 4.

The structure of the frameworks 16 and 18 and the means by which the cylinders 17 are secured thereto for support are illustrated in Figs. 4 through 8. Turning first, however, to Figs. 4, 5 and 6, the structure of the forward framework and securing means will be described. A framework 16, of which there are three extending transversely of the forward end of the trailer, one for each of the three bays into which the trailer has been separated by partitions 14, comprises a plurality of substantially vertically aligned and vertically spaced channel members 40 reinforced by T sections 41, the former being adapted to be bolted to a pair of vertical angle irons 15. Each of the containers 17 is provided with a threaded neck 42 at its forward end which is adapted to have screwed thereon a steel block 43. Lock nuts 44 of hexagonal shape are also provided and adapted to be threaded onto the necks 42 of the containers to lock the threaded blocks in position. Each of the blocks 43 is provided with 4 threaded studs 45. A pair of these studs projects from each of a pair of opposite edges of the block, and each is adapted to extend through an opening in the flange of a channel member 40 when the containers and channel members are in place as illustrated in Figs. 4 and 5. A nut 46 is threaded onto each stud 45 to secure the block to a channel member 40. As may be seen in Figs. 2 and 4, the channel members 40 and the blocks 43 are of such size that the containers 17 are supported with a clearance between them whereby none is called upon to support the weight of another. Furthermore, as can be readily seen, this type of supporting means for the cylinders prevents rotation thereof when so supported, and furthermore prevents sliding or longitudinal movement thereof.

Figure 7:
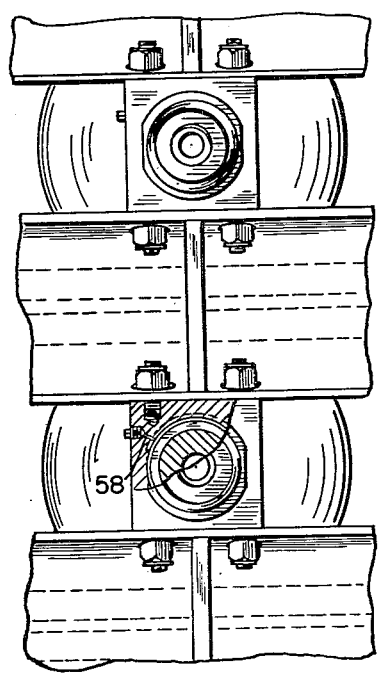
Fig. 7 is an end elevation partially in section of a portion of the framework supporting the front ends of the containers.
Figure 8:
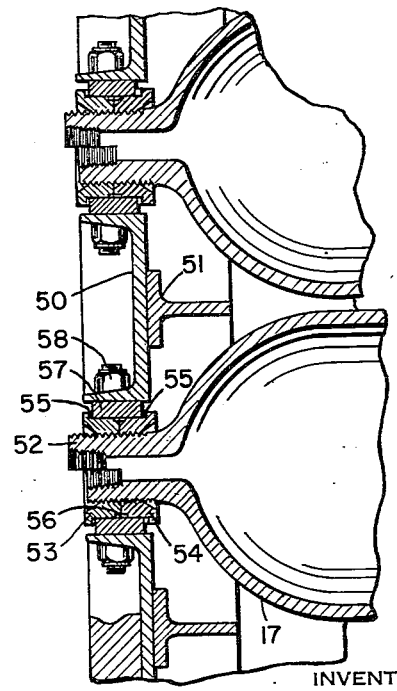
Fig. 8 is a sectional side elevation of the same portion of the trailer as is shown in Fig. 7.

The rear, transversely extending cylinder-supporting frameworks 18 of which there are also three, one being provided for each bay, are illustrated in Figs. 6 through 8 and are substantially similar to the forward frameworks 16. Thus each comprises a plurality of vertically aligned and vertically spaced channel members 50 reinforced by T sections 51, the former being removably secured to vertical angle 15 at the rear of the trailer as by bolting.

Each pair of channel sections 50 is adapted to receive between the adjacent flanges thereof the threaded necks 52 of the rear end of the containers 17. The means for connecting the threaded necks to the channel members 50, however, are somewhat different than are those for securing the necks 42 to the channel members 40 at the front of the trailer and are designed to permit limited longitudinal movement of the neck 52 to accommodate expansion of the cylinders due to temperature or pressure variations. Each of these securing or connecting means comprises a pair of bronze shoulder bushings 53 and 54 of substantially similar design adapted to be threaded or screwed onto a cylinder neck 52 and locked thereon in position by abutment of one against the other. Each of the bushings 53 and 54 is provided with peripheral channels 55 and 56, the bottoms of the channels 55 of the two bushings forming a bearing surface for a steel block 57 when the two bushings have been threaded onto the neck 52 of a container 17. The channels 56 of the two bronze shoulder bushings 53 and 54 form, when the bushings are in abutment on the neck of a container, a pocket for a lubricant which may be injected thereinto through a passage 58 through the wall of block 57 (Fig. 7). The block 57 is of similar outer dimensions to the blocks 43 previously discussed in connection with the mounting of the forward ends of the containers. Block 57, however, contains a bore, the face of which is adapted to ride on the bearing faces of channels 55 of bushings 53 and 54. The blocks 57 are adapted to be secured to the channel members 50 in the same manner as are the previously described blocks 43 to the channel members 40 at the forward end of the vehicle, that is, each block 57 is provided with four threaded studs which are adapted to pass through the adjacent flanges of a pair of channel members 50 and to be secured thereto by nuts 58.

It will be noted that the bearing surface formed by the channels 55 of shoulder bushings 53 and 54 is somewhat wider than is the width of the bearing face of a block 57 whereby limited relative axial movement between these shoulder bushings and the block is permitted. The relative movement permitted allows accommodation by this connecting means of dimensional changes in the container 17 due to temperature or pressure variations.

The manner in which the plurality of containers and the frameworks 16 and 18 are assembled in the trailer is relatively simple. The trailer frame, the partitions 14 and the lowermost channel members 40 and 50 of the frameworks 16 and 18, respectively, are permanently located in place. The assembly of the remaining portions of the frameworks 16 and 18 and the containers in any bay can be readily accomplished in the following manner: All of the containers are provided with the various neck blocks and bushings as previously described. The lower row of containers is then placed within the bay and located so that a pair of studs projecting from each neck block extends through the flange of the lowermost channel member. The retaining bolts are then supplied thereto to lock the containers in place. The next upper channel members are then lowered into the bay at the opposite ends thereof and bolted to the adjacent vertical angle irons, the lower flanges of the channel members receiving through holes therein the upwardly projecting studs of the neck blocks of the containers already in place. The securing nuts are then applied to the last-mentioned studs and the next horizontal row of containers lowered into the bay and secured to the channel members as before, and so on until all of the containers and the supporting frameworks are in place. In this manner all of the containers for all of the bays may be positioned and assembled in the trailer. It will be apparent from the fact that the cylinders of each bay are assembled therein completely independently of the cylinders and the supporting frameworks in the other bays that in order to replace any cylinder in the trailer, only those cylinders above it within the same bay need be disturbed or removed. Furthermore it will be noted that many identical parts are employed in building up the supporting frameworks and in securing the cylinders thereto and that by reason of this, a relatively great interchangeability of parts is possible.

I claim:

1. In a transport vehicle, a frame, a plurality of substantially vertical partitions extending longitudinally of the frame and forming a plurality of bays, a plurality of elongated containers in each bay and arranged in horizontal rows, each container having a neck at each end, a plurality of horizontal frame members at each end of each bay extending transversely of the frame, means removably securing each of said frame members to an end of a partition, said frame members being spaced vertically with respect to one another and each vertical pair thereof receiving between them the necks of the adjacent ends of the containers of a horizontal row, and means removably securing the necks of the containers to the frame members.

2. In a transport vehicle, a frame, a plurality of substantially vertical partitions extending longitudinally of the frame and forming a plurality of bays, a plurality of elongated containers in each bay and arranged in horizontal rows, each container having a threaded neck at each end, a plurality of horizontal frame members at each end of each bay extending transversely of the frame, means removably securing each of said frame members to an end of a partition, said frame members being spaced vertically with respect to one another and each vertical pair thereof receiving between them the necks of the adjacent ends of the containers of a horizontal row, and threaded means non-rotatably but removably securing the necks of the containers to the frame members.

3. In a transport vehicle, a frame, a plurality of substantially vertical partitions extending longitudinally of the frame and forming a plurality of bays, a plurality of elongated containers in each bay and arranged in horizontal rows, each container having an exteriorly threaded neck at each end, a plurality of horizontal frame members at each end of each bay extending transversely of the frame, means removably securing each of said frame members to an end of a partition, said frame members being spaced vertically with respect to one another and each vertical pair thereof receiving between them the necks of the adjacent ends of the containers of a horizontal row, and interiorly threaded means removably securing the necks of the containers to the frame members, said means at one end of the plurality of containers being so constructed and arranged that limited longitudinal movement of the adjacent ends of the containers is permitted, whereby dimensional changes in the containers due to temperature or pressure variations can be accommodated.

4. In a transport vehicle, a frame, a plurality of substantially vertical partitions extending longitudinally of the frame and forming a plurality of longitudinally extending bays, a plurality of elongated containers in each bay and arranged in horizontal rows, each container having a threaded neck at each end, a plurality of horizontal frame members at each end of each bay extending transversely of the frame and each removably secured to an end of a partition, said frame members at each end of each bay being spaced vertically with respect to one another, a block screwed on each neck of each container, each of said blocks being received between a spaced vertical pair of frame members, and means removably securing each block to said pair of frame members, all of the blocks screwed onto the adjacent ends of the containers of one horizontal row being received and removably secured between the same pair of spaced vertical frame members.

5. Apparatus according to claim 4 which includes means removably securing the block screwed onto the neck at one end of each container to a pair of frame members against any movement whatever, and means movably securing the block screwed onto the neck at the opposite end of each container between a pair of frame members to accommodate at least limited relative movement between said last-mentioned block and said last-mentioned frame members in a direction longitudinally of the container.

6. In a transport vehicle, a frame, a substantially vertical framework secured to said frame at each end thereof and extending substantially transversely thereof, a plurality of elongated containers supported by and between said frameworks, each of said containers having a threaded neck at each opposite end thereof, a block secured on each neck of each container, means removably and fixedly securing the block on one neck of each container to one framework, and means movably securing the block on the other neck of each container to the other framework to accommodate limited movement thereof relative to said last-mentioned framework in a direction longitudinally of the container whereby dimensional changes in the container due to temperature or pressure variations can be accommodated.

7. In a transport vehicle, a frame, a substantially vertical framework secured to said frame at each end thereof and extending substantially transversely thereof, a plurality of elongated containers supported by and between said frameworks, means for fixedly securing the ends of the containers adjacent one framework to that framework, the other framework being made up of a plurality of horizontally disposed channel members vertically aligned and spaced from one another, the ends of the containers adjacent said other framework having threaded necks, a bushing threaded onto each of the threaded necks of said containers and having a peripheral channel the base of which is adapted to act as a bearing surface, and a block having a central bore slightly larger in dimension than the base of said peripheral channel mounted on each bushing with the inner face of its bore riding on the bearing surface of the bushing, each of said blocks being secured between and to the adjacent flanges of a pair of adjacent channel members, the peripheral channels in the bushings having a width substantially greater than the thickness of the blocks whereby relative movement of the bushings and the blocks is permitted in a direction axially of the bushings and limited movement of the neck of a container relative to a block and said other framework is permitted to accommodate dimensional changes in a container due to temperature or pressure variations.

References Cited in the file of this patent

UNITED STATES PATENTS

| | | |
|---|---|---|
| 1,661,000 | Madden et al. | Feb. 28, 1928 |
| 2,024,411 | Willoughby | Dec. 17, 1935 |